(12) United States Patent
Holbein et al.

(10) Patent No.: US 7,891,596 B2
(45) Date of Patent: Feb. 22, 2011

(54) BELT RETRACTOR FOR A SAFETY BELT SYSTEM AND METHOD TO DETERMINE A BELT WEBBING WITHDRAWAL IN A BELT RETRACTOR

(75) Inventors: Wolfgang Holbein, Alfdorf (DE); Michael Stuetz, Gschwend (DE); Marc Arndt, Schwaebisch Gmuend (DE)

(73) Assignee: TRW Automotive GmbH, Alfdorf (DE)

( * ) Notice: Subject to any disclaimer, the term of this patent is extended or adjusted under 35 U.S.C. 154(b) by 357 days.

(21) Appl. No.: 11/827,292

(22) Filed: Jul. 11, 2007

(65) Prior Publication Data

US 2008/0012285 A1    Jan. 17, 2008

(30) Foreign Application Priority Data

Jul. 11, 2006    (DE) .................. 10 2006 032 066

(51) Int. Cl.
*B60R 22/38* (2006.01)
(52) U.S. Cl. .................. 242/382.1; 242/382.4; 242/383
(58) Field of Classification Search .............. 242/382.1, 242/382.4, 383, 379.1; 180/268; 280/807
See application file for complete search history.

(56) References Cited

U.S. PATENT DOCUMENTS

| | | | | |
|---|---|---|---|---|
| 4,445,648 A | * | 5/1984 | Bloch | .................. 242/385 |
| 6,290,160 B1 | | 9/2001 | Strobel | |
| 6,676,060 B2 | * | 1/2004 | Tanaka et al. | ............ 242/390.9 |
| 6,726,249 B2 | * | 4/2004 | Yano et al. | .................. 280/805 |
| 6,908,112 B2 | * | 6/2005 | Yano et al. | .................. 280/805 |
| 6,918,558 B2 | * | 7/2005 | Tanaka et al. | ............ 242/390.8 |
| 7,021,582 B2 | * | 4/2006 | Tanaka et al. | ............ 242/390.8 |
| 7,080,801 B2 | * | 7/2006 | Prokscha et al. | ......... 242/390.9 |
| 2008/0105777 A1 | * | 5/2008 | Holbein et al. | ........... 242/379.1 |

FOREIGN PATENT DOCUMENTS

| | | |
|---|---|---|
| DE | 29820086 | 5/1999 |
| DE | 29908716 | 10/1999 |
| DE | 10136267 | 2/2002 |
| FR | 2783476 | 3/2000 |

\* cited by examiner

*Primary Examiner*—Sang Kim
(74) *Attorney, Agent, or Firm*—Tarolli, Sundheim, Covell & Tummino LLP

(57) ABSTRACT

A belt retractor for a safety belt system has a belt spool and a belt webbing withdrawal measurement arrangement, which has a control disk, a magnetic sensor element and a magnetic cogwheel driven by the control disk and constructed as a separate part. In addition, a method is described to determine the belt webbing withdrawal in a belt retractor.

14 Claims, 4 Drawing Sheets

BELT RETRACTOR FOR A SAFETY BELT SYSTEM AND METHOD TO DETERMINE A BELT WEBBING WITHDRAWAL IN A BELT RETRACTOR

TECHNICAL FIELD

The invention relates to a belt retractor for a safety belt system and a method to determine a belt webbing withdrawal in a belt retractor.

BACKGROUND OF THE INVENTION

To an increasing extent in motor vehicles, arrangements to protect the occupant, such as belt tensioners, force limiters used in belt retractors or else gas generators for gas bag modules are adapted in their performance according to the severity of the accident and the position of the occupant. The information of relative and absolute belt webbing withdrawal is very helpful here.

In belt retractors in which the driving spring for winding the belt webbing is assisted by a motor in order to ensure increased comfort in the fastened state, it is necessary in addition to detect the absolute belt webbing position in order to determine whether the belt is in the placement position or is moving at all. Depending on requirements, the assisting motor can then be activated.

It is therefore an object of the invention to provide a belt retractor with a belt webbing withdrawal measurement arrangement and respectively a method to determine the belt webbing withdrawal in a belt retractor, by means of which the belt webbing withdrawal and respectively the belt webbing position can be determined in a simple manner.

BRIEF SUMMARY OF THE INVENTION

This is achieved in a belt retractor for a safety belt system, having a belt spool and a belt webbing withdrawal measurement arrangement which has a control disk, a magnetic sensor element and a magnetic cogwheel which is driven by the control disk and is constructed as a separate part. When belt webbing is withdrawn from the belt spool, the latter rotates or respectively assumes a particular position, with the control disk moving together with the belt spool. The magnetic cogwheel is driven via the control disk, its position is determined in relation to the sensor element and the withdrawal of belt webbing is deduced therefrom. It is to be noted that in the context of the invention, belt webbing withdrawal is to be understood both as the process and also the result which can also be designated as the belt webbing position. The belt retractor according to the invention is distinguished by a particularly simple development, a simple assembly and a compact type of construction. Owing to the separately constructed magnetic cogwheel, a conventional control disk can be used, which is slightly modified if necessary.

The control disk is advantageously coupled to the belt spool via a reduction gear. In this way, the total number of revolutions of the belt spool for a complete unwinding of the belt webbing can be reproduced to a single revolution of the control disk or less, whereby a system is created which measures absolutely.

According to a preferred embodiment, the control disk is coupled to the magnetic cogwheel via an intermediate wheel. The position of the magnetic cogwheel is therefore able to be freely selected within certain limits; in particular, the magnetic cogwheel can be arranged radially outside the control disk, which can result in advantages with regard to the engineering of the structural space.

The magnetic cogwheel may consist of a plastic bonded magnetic material or a cogwheel with a magnet embedded therein. In both cases, the cogwheel is preferably constructed so that the two magnet poles lie diametrically opposite each other.

In particular, the sensor element is coupled to an evaluating electronics which determines the belt webbing withdrawal from signals emitted by the sensor element. Depending on the type of sensor element which is used, different signals can be emitted here, to which the associated evaluating electronics is adapted.

A particularly favorably priced solution is produced when the evaluating electronics is integrated into an existing control apparatus. This may be a control apparatus for a vehicle seat, for a gas bag module or a combined control apparatus. Alternatively, it is likewise possible to construct the evaluating electronics as an independent control apparatus. The information concerning the belt webbing withdrawal at a particular moment can be transmitted in both cases for example via a vehicle bus system to various pieces of apparatus which require this information.

In one embodiment, the sensor element has a chip with four symmetrically arranged Hall sensors and is therefore constructed as a sensor element with an integrated angle calculation, which directly produces the angle of the magnetic field.

A particularly favorably priced and space-saving accommodation results when the control disk is part of a child safety system. In this case, no separate component has to be provided for the control disk.

According to a second aspect of the invention, a method is provided to determine the belt webbing withdrawal in the belt retractor which has already been described, the method having the following steps. Firstly, the angular position of the magnetic cogwheel is determined relative to the sensor element by detecting suitable signals and then the belt webbing withdrawal is determined by an evaluating electronics by means of the angular position which has been determined.

According to a further development, provision is made that the sensor element additionally emits diagnostic signals which are used to determine and make plausible the belt webbing withdrawal. The diagnostic signals are, for example, information as to whether the magnetic field has the correct intensity and is sufficiently linear for determining the angular position.

DETAILED DESCRIPTION OF THE PREFERRED EMBODIMENTS

Figure 2:
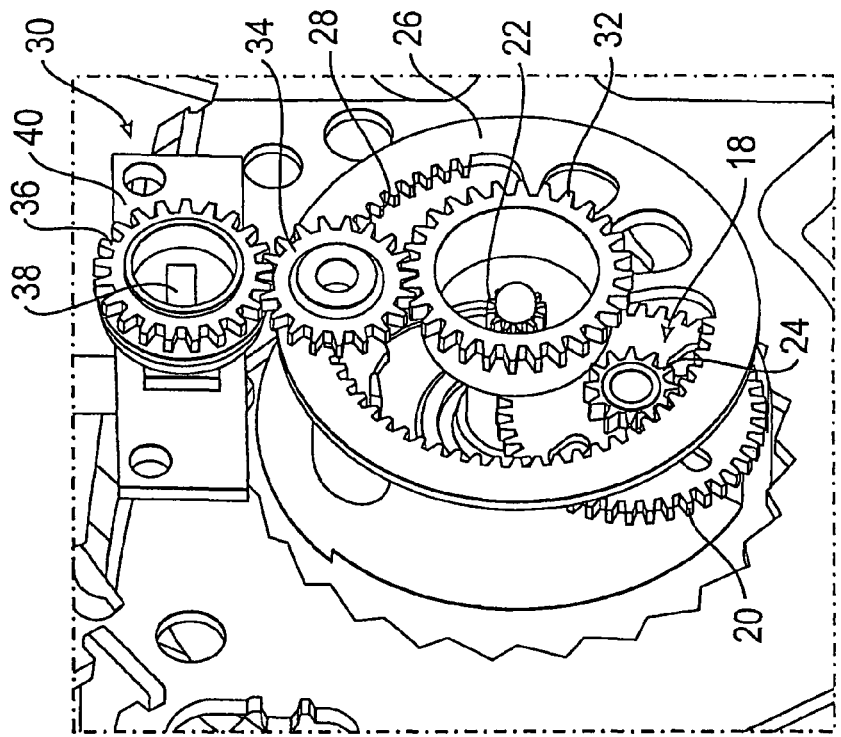
FIG. 2 shows a perspective view of the belt webbing withdrawal measurement arrangement of the belt retractor of FIG. 1.
Figure 1:
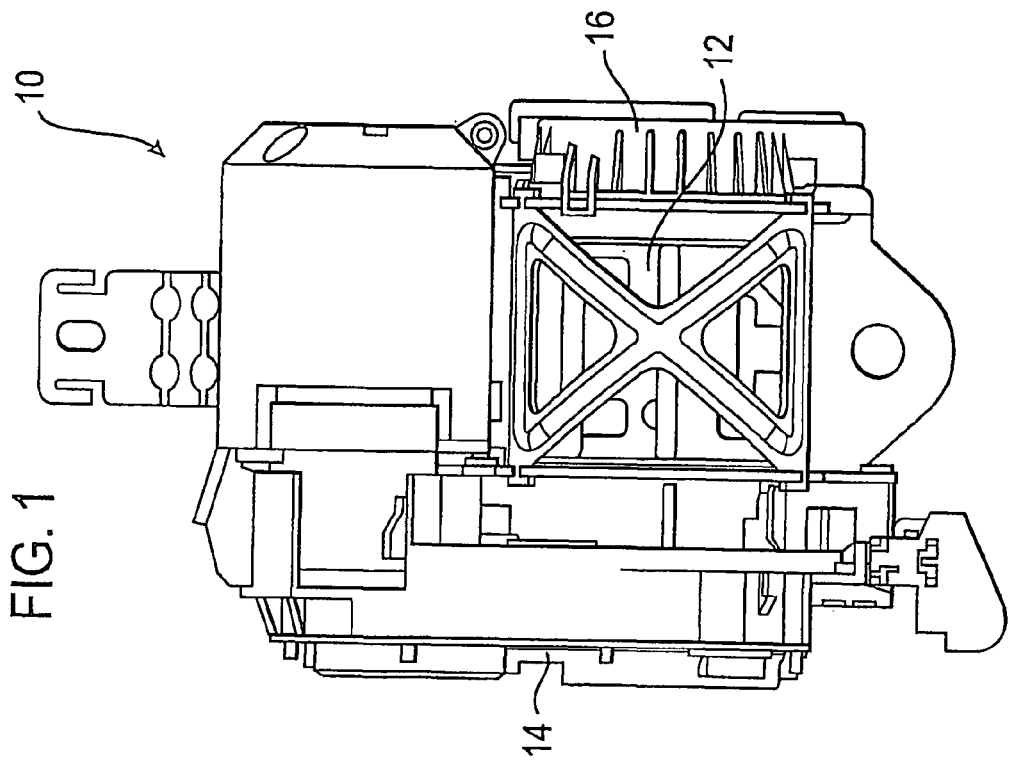
FIG. 1 shows a view of a belt retractor according to the invention.
Figure 3:
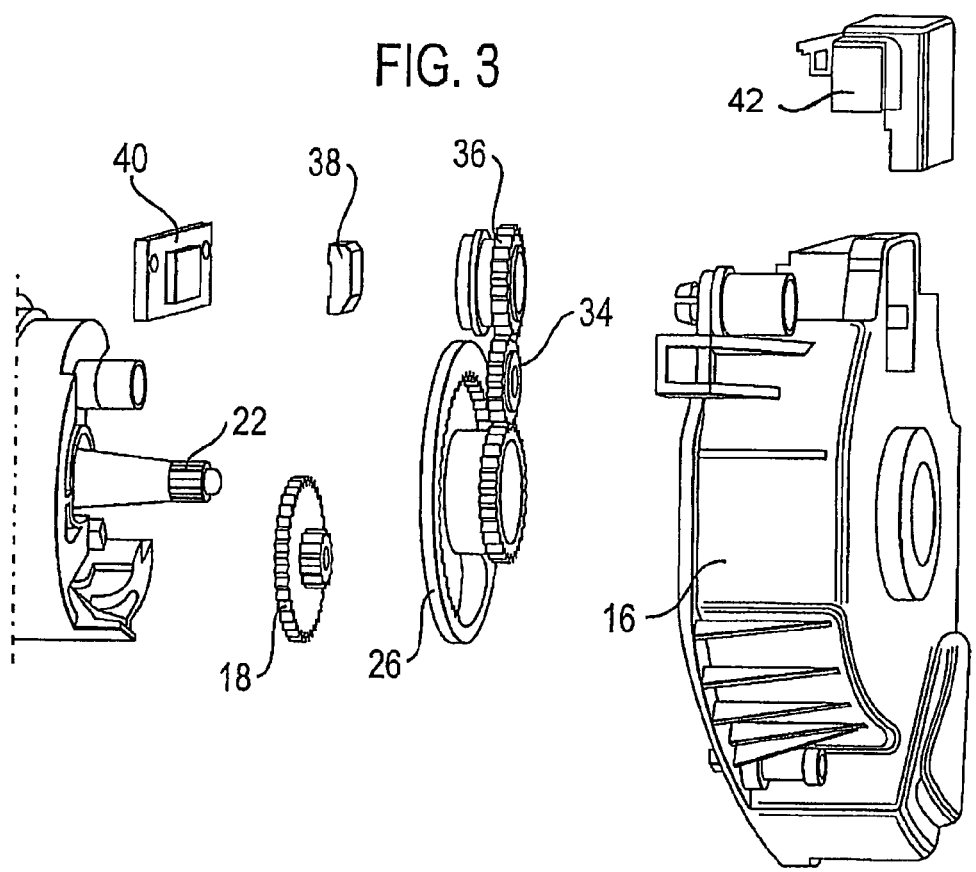
FIG. 3 shows an exploded view of the belt webbing withdrawal measurement arrangement of FIG. 2.
Figure 4:
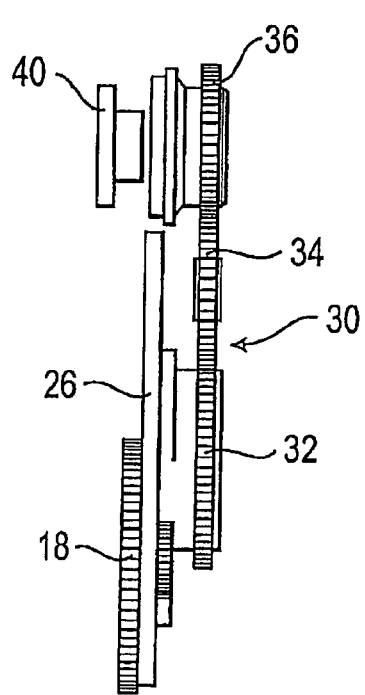
FIG. 4 shows a side view of the essential elements of the belt webbing withdrawal measurement arrangement of FIG. 2.
Figure 5:
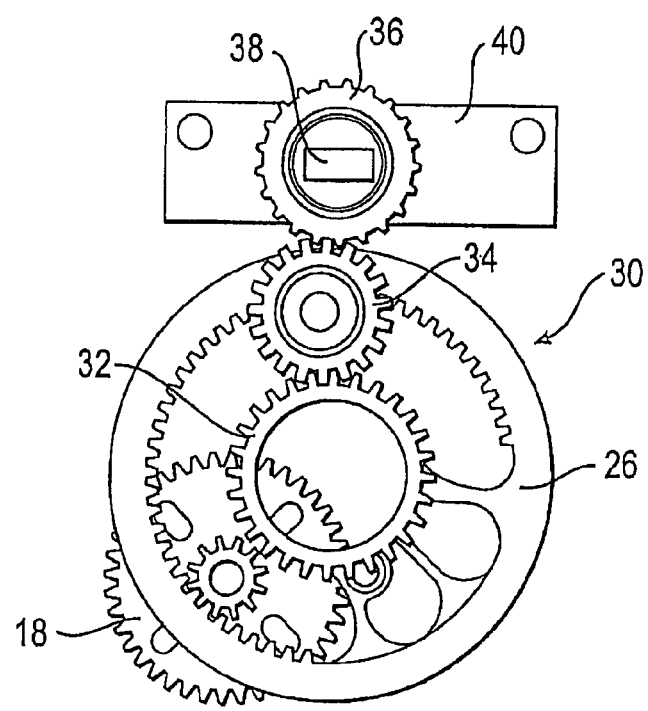
FIG. 5 shows a top view onto the essential elements of the belt webbing withdrawal measurement arrangement of FIG. 2.

FIG. 1 shows a belt retractor 10 according to the invention, which has a belt spool 12 on which the belt webbing is wound, which is not shown in the figure. The shaft of the belt spool 12 is jeweled between a driving spring shell 14, in which a driving spring—not illustrated in the figure—is housed for rolling up the belt webbing, and a locking side shell 16. A locking system, which registers the deceleration of the vehicle or of the occupant via a vehicle-sensitive sensor and a belt webbing-sensitive sensor, is contained in the locking side shell 16.

A child safety system is also housed in the locking side shell 16. This has a stepped gear 18 (see FIGS. 2 to 5), the outer teeth 20 of which mesh with teeth 22 on the belt spool 12. In so doing, the stepped gear 18 reduces the revolutions of the belt spool 12 via inner teeth 24 to a control disk 26, this being a ratchet wheel with inner teeth 28. In the embodiment which is shown, the complete belt webbing withdrawal is reproduced to approximately a ¾ revolution of the control disk 26. The control disk 26 is therefore coupled via a reduction gear with the belt spool 12, which is formed substantially by the stepped gear 18. When the belt webbing is withdrawn completely, a rocker (not shown) is actuated, which activates the locking system. Child's seats can thereby be securely fastened in the vehicle. When the belt webbing is taken off, this rocker is deactivated by a second detent nose.

A belt webbing withdrawal measurement arrangement 30, which likewise uses the control disk 26 in order to determine how much belt webbing is or is being withdrawn from the belt spool 12, is likewise arranged in the locking side shell 16. For this purpose, the control disk 26 has additional encircling teeth 32 which transfer the rotary movement of the control disk 26 via an intermediate wheel 34 to a magnetic cogwheel 36. The magnetic cogwheel 36 is constructed as a separate part and may consist of a plastic bonded magnetic material or, as shown in the figures, may be a conventional cogwheel with a magnet 38 embedded therein.

The magnet 38 is arranged in such a way that its poles lie diametrically opposite each other (in relation to the centre of the magnetic cogwheel 36). Immediately opposite the magnetic cogwheel 36, a magnetic sensor element 40 is housed in the locking side shell 16, the sensor element 40 being arranged radially outside the control disk 26. The sensor element 40 is arranged flat in relation to the direction of view of FIG. 5 under the magnetic cogwheel 36, and detects a change in the magnetic field generated by the magnet 38. As this change in the magnetic field is coupled geometrically with the belt webbing withdrawal and a complete withdrawal of the belt webbing is reduced by the selected arrangement to one revolution of the magnetic cogwheel 36, this is an absolute measurement. With a corresponding mechanism, the transmission ratio could be further reduced in order to reach a higher resolution of the measured values. A cover is designated by reference number 42.

Deviating from the development shown in the figures, the sensor element 40 (including an associated plate) can form a pre-assembly group with the magnetic cogwheel 36 and a shared support piece, this group being inserted into the locking side shell 16 during assembly, brought into engagement with the (existing) child safety teeth, and secured. The support piece here is preferably magnetically neutral. An advantage of this development is the ability of the pre-assembly group to be checked separately, this group being additionally able to be calibrated with a corresponding wiring of the plate. In addition, the material of the support piece is independent of the shell material, which has a favorable effect on the temperature resistance, the accuracy of positioning, the continuous running behavior and the structural space.

Depending on the sensor element 40 which is used, different possibilities exist for connecting the sensor element and evaluating the signals emitted by the sensor element. As can be seen from FIG. 6, the sensor element 40 is coupled to an evaluating electronics 44 which determines the belt webbing withdrawal from the signals emitted by the sensor element 40. According to a first embodiment (FIG. 6a), provision is made that the evaluating electronics 44 in the form of a microcontroller receives signals from the sensor element concerning the sine and cosine vectors of the magnetic field and determines the belt webbing withdrawal (or respectively the position of the belt spool) from this information.

An alternative development according to FIG. 6b makes provision that the evaluating electronics 44 receives from the sensor element 40, which has at its disposal an integrated angle calculation, an analog or pulse width-modulated signal which indicates directly the angular position of the magnet 38 in relation to the sensor element 40. FIG. 6c likewise provides a sensor element 40 with integrated angle calculation, with this emitting a digital signal to the evaluating electronics 44.

In the embodiment according to FIG. 6d, in addition to the magnetic field angle information, diagnostic signals are transmitted by the sensor element 40 to the evaluating electronics 44, these signals being used to calculate and make plausible the belt webbing withdrawal. This is information as to whether the magnetic field has the correct-intensity and is sufficiently linear to determine the position.

The evaluating electronics 44 can be constructed as an independent control apparatus, but advantageously an existing control apparatus (ACR, vehicle seat control apparatus, gas bag module control apparatus, combination control apparatus etc.) is used, in order to read in the signals of the sensor element 40 and determine therefrom the belt webbing withdrawal. The information concerning the belt webbing withdrawal can be transferred for example via a vehicle bus system to further control apparatus which require this information.

Figure 7:
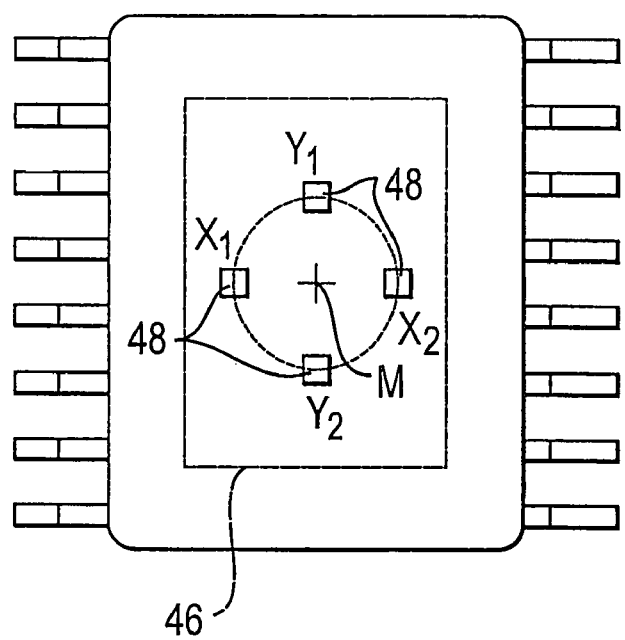
FIG. 7 shows a diagrammatic illustration of a sensor element used in the belt webbing withdrawal measurement arrangement according to FIG. 2.
Figure 8:
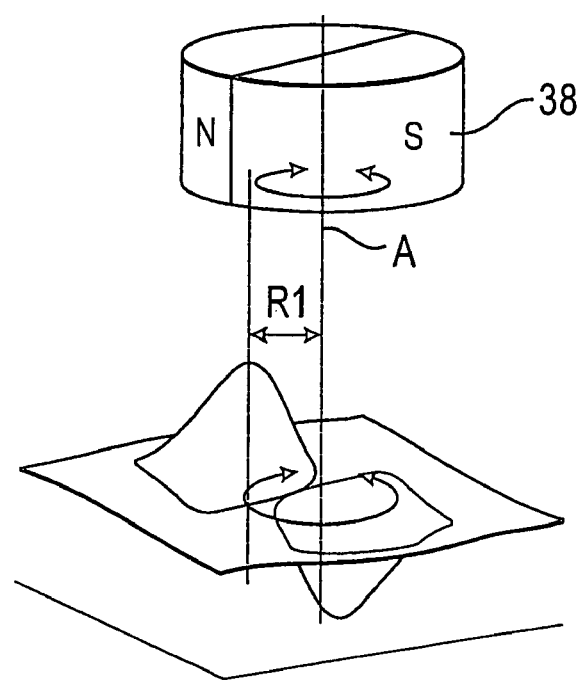
FIG. 8 shows diagrammatically the connection between the alignment of the magnet and the vertical magnetic field component, which is detected by the sensor element to determine the belt webbing withdrawal.

FIG. 7 shows an example of a sensor element 40 with integrated angle calculation. This has a chip 46 with four Hall sensors 48 arranged symmetrically to the central point M of the chip 46. The signals emitted from the Hall sensors 48 are designated by $X_1$, $X_2$, $Y_1$ and $Y_2$ (cf. FIG. 7). The sensor element 40 with the chip 46 is in a secure position with respect to the retractor, opposite the magnet 38, which can rotate relative to the chip 46 and therefore changes the angle of its magnetically neutral axis in relation to the Hall sensors 48. The magnet 38 is magnetized diametrically or unilaterally in a bipolar manner. The orientation and configuration of the Hall sensors 48 is selected such that the angular position of the magnet 38 relative to the sensor element 40 can be measured by means of the vertical component of the magnetic field, which is illustrated in FIG. 8 for the magnet 38 shown there.

The differential signal $Y_1 - Y_2$ produces a sine vector of the magnetic field, whereas the differential signal $X_1 - X_2$ produces a cosine vector orthogonal thereto. The angle $\phi$ between the magnet 38 and the sensor element 40 can be calculated with the following equation:

$$\Phi = \arctan \frac{Y_1 - Y_2}{X_1 - X_2}$$

The belt webbing withdrawal is determined in the evaluating electronics 44 by means of the angle φ between the magnet 38 and the sensor element 40.

In FIG. 8 A designates the rotation axis of the magnet 38, which runs through the central point M of the chip. $R_1$ designates the distance of the Hall sensors 48 from the central point M.

Alternatively, a so-called GMR sensor or AMR sensor can be used, which detects the absolute angle of the magnetic field via its sensor element and therefore detects the absolute belt webbing withdrawal. In both cases, a diametral magnet is used here. The horizontal magnetic field lines are used here to evaluate the angle.

In order to obtain reliable measured values, a rare earth magnet (Nd—Fe—B+binding agent) is used, for example.

The information determined by the belt webbing withdrawal measurement arrangement 30 concerning the belt webbing withdrawal (or respectively the belt webbing position) existing at a particular moment can be used for various applications. Thus, by determining the belt webbing withdrawal and comparison with a defined belt webbing position (which is regularly checked for example), an assessment can be made as to whether the vehicle occupant is bending forward. This information can be used in order to control or adapt restraint systems present in the vehicle, for instance a two-stage gas bag. Likewise, the information concerning the belt webbing withdrawal can be used to make plausible the signals of a video detection system, a weight sensor or another system for personal identification and positioning.

A further application lies in ascertaining the weight of the occupant, which can be determined with sufficient accuracy by an absolute measurement of the belt webbing withdrawal, in so far as data is available concerning the sitting position and a belt height adjuster.

The information on belt webbing withdrawal can be used in addition for motor-assisted comfort functions. In belt retractors, particularly with a reversible belt tensioner, the driving spring force can be reduced if a motor is switched on when the belt webbing is being taken off, which assists the driving spring in its retracting action.

If, for instance, in the case of a driving spring with a reduced force, the belt webbing is withdrawn without the occupant fastening the belt, the signal of belt webbing withdrawal can serve to activate the motor assistance.

A further case of application is as follows. If the motor control arrangement experiences a deceleration of the motor speed during the winding of the belt webbing after unfastening the belt, this may be the end position of the insert tongue or a deceleration of the belt webbing caused by the vehicle occupant or the vehicle geometry. By detecting the belt webbing withdrawal (or its change), various possibilities result for controlling or regulating. Thus, when belt webbing is withdrawn again, it can be deduced that the occupant would like to fasten the belt again. When the belt webbing is stationary, this may be a deceleration of the belt webbing on a seat contour. In this case, the retraction process can be repeated by the motor as often as required, until the end position is reached.

The information on the belt webbing withdrawal can also be used in the case of a standard driving spring with motor assistance according to requirements, which is used for example at low temperatures or in order to compensate for aging effects. If the sensor element does not detect any movement of belt webbing after unfastening (i.e. a change in the belt webbing withdrawal), the motor assistance is activated, which brings the insert tongue into its final position.

Figure 6:
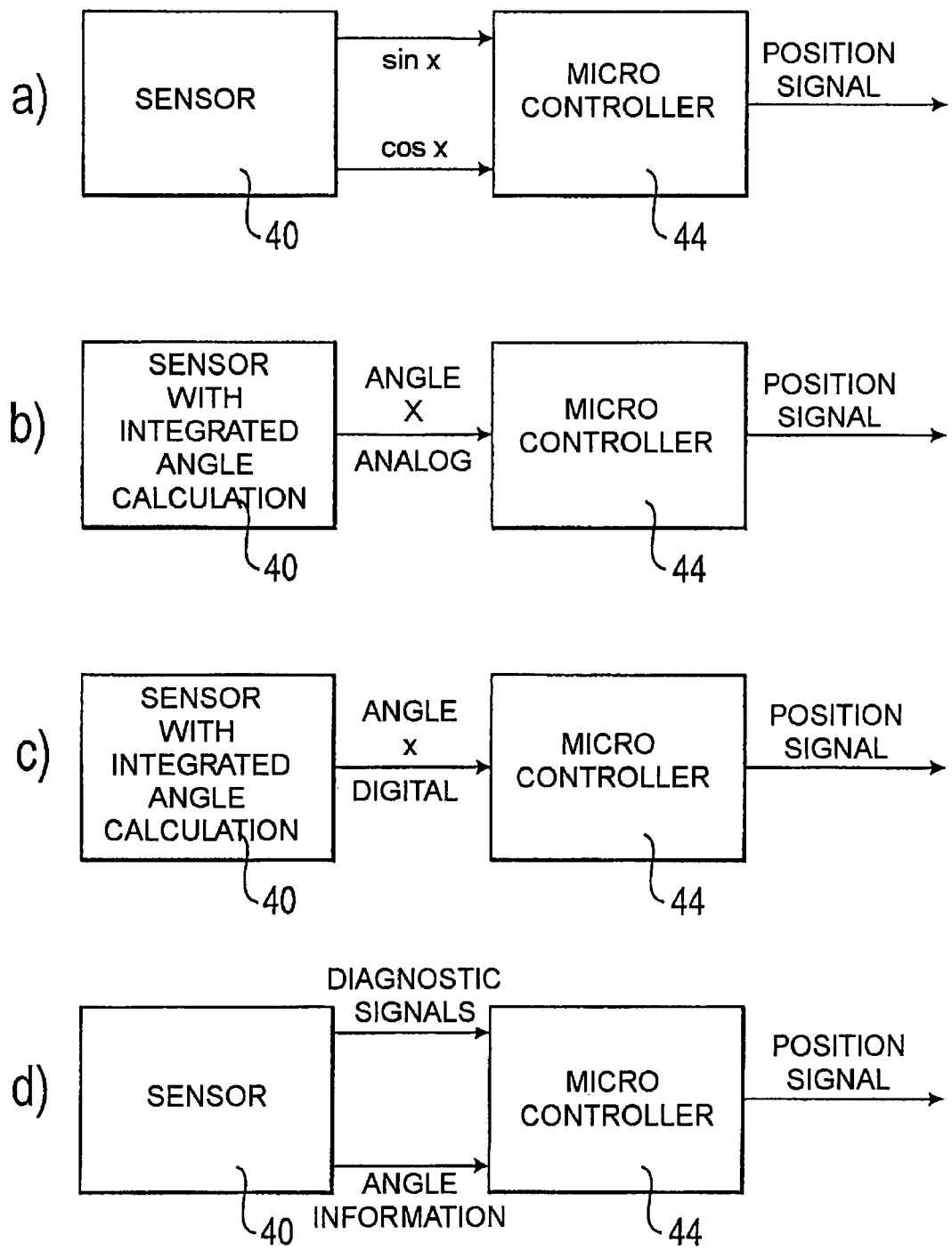
FIG. 6 shows various block diagrams of sensor elements used in the belt webbing withdrawal measurement arrangement according to FIG. 2, with associated evaluating electronics.

| Legend to drawings FIG. 6 | | | |
| --- | --- | --- | --- |
| a) SENSOR Signal | sin x cos x | MICRO CONTROLLER | Position |
| b) SENSOR Signal with integrated angle calculation | angle x analog | MICRO CONTROLLER | Position |
| c) SENSOR Position Signal with integrated angle calculation | angle x digital | MICRO CONTROLLER | |
| d) SENSOR Signal | diagnostic signals angle information | MICRO CONTROLLER | Position |

The invention claimed is:

1. A belt retractor for a safety belt system, having
   a belt spool (12) and
   a belt webbing withdrawal measurement arrangement (30), which has a control disk (26) moving together with the belt spool (12) during webbing withdrawal, a magnetic sensor element (40) and a magnetic cogwheel (36) driven by the control disk (26) and constructed as a separate part, the magnetic sensor element (40) detecting rotation of the magnetic cogwheel (36) to determine an amount of belt webbing withdrawal.

2. The belt retractor according to claim 1, wherein the control disk (26) is coupled to the belt spool (12) via a reduction gear.

3. The belt retractor according to claim 1, wherein the control disk (26) is coupled to the magnetic cogwheel (36) via an intermediate wheel (34).

4. The belt retractor according to claim 1, wherein the magnetic cogwheel (36) consists of a plastic bonded magnetic material.

5. The belt retractor according to claim 1, wherein the magnetic cogwheel (36) is a cogwheel with a magnet (38) embedded therein.

6. The belt retractor according to claim 5, wherein a distance between the magnetic sensor element (40) and the magnet (38) is constant.

7. The belt retractor according to claim 1, wherein the sensor element (40) is coupled to an evaluating electronics (44) which determines the amount of belt webbing withdrawal from signals emitted by the sensor element (40).

8. The belt retractor according to claim 7, wherein the evaluating electronics (44) is integrated into an existing control apparatus.

9. The belt retractor according to claim 1, wherein the sensor element (40) has a chip (46) with four symmetrically arranged Hall sensors (48).

10. The belt retractor according to claim 1, wherein the control disk (26) is part of a child safety system.

11. A method to determine a belt webbing withdrawal in a belt retractor (10) according to claim 1, the method having the following steps:

- the angular position of the magnetic cogwheel (36) relative to the sensor element (40) is determined by detecting changes in the magnetic field generated by the magnetic cogwheel (36), and
- the amount of belt webbing withdrawal is determined by an evaluating electronics (44) by means of the angular position.

12. The method according to claim 11, wherein the sensor element (40) additionally emits diagnostic signals which are used to determine and make plausible the amount of belt webbing withdrawal.

13. The belt retractor according to claim 1, wherein the belt webbing withdrawal measurement arrangement (30) continuously detects an amount of rotation of the magnetic cogwheel (36) to determine the amount of belt webbing withdrawal.

14. The belt retractor according to claim 1, wherein the control disk (26) moves together with the belt spool (12) during webbing withdrawal and retraction.

* * * * *